July 8, 1947.    C. H. WILEN    2,423,571
SWIMMING TAIL
Filed Dec. 20, 1944    4 Sheets-Sheet 1
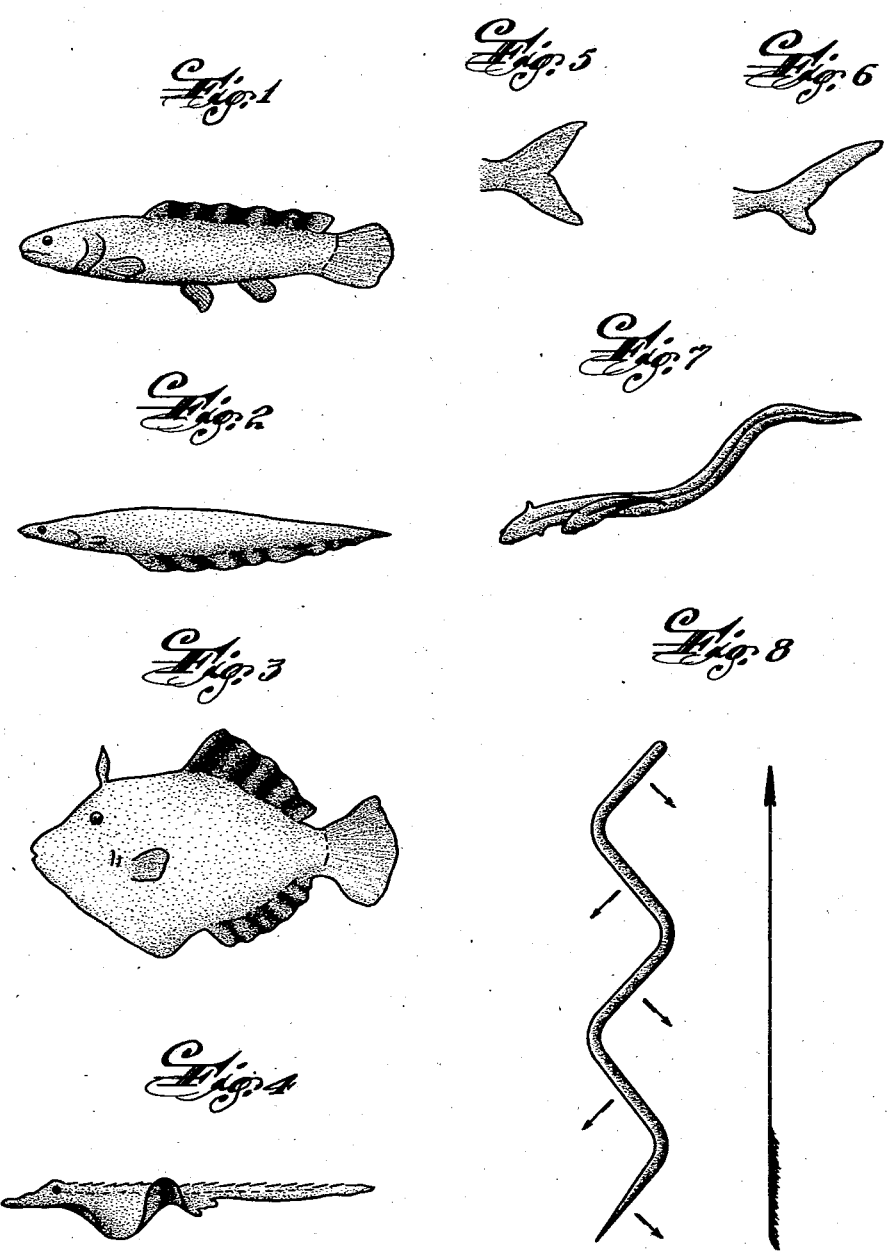
INVENTOR.
Charles H. Wilen
BY A. D. T. Libby
Attorney

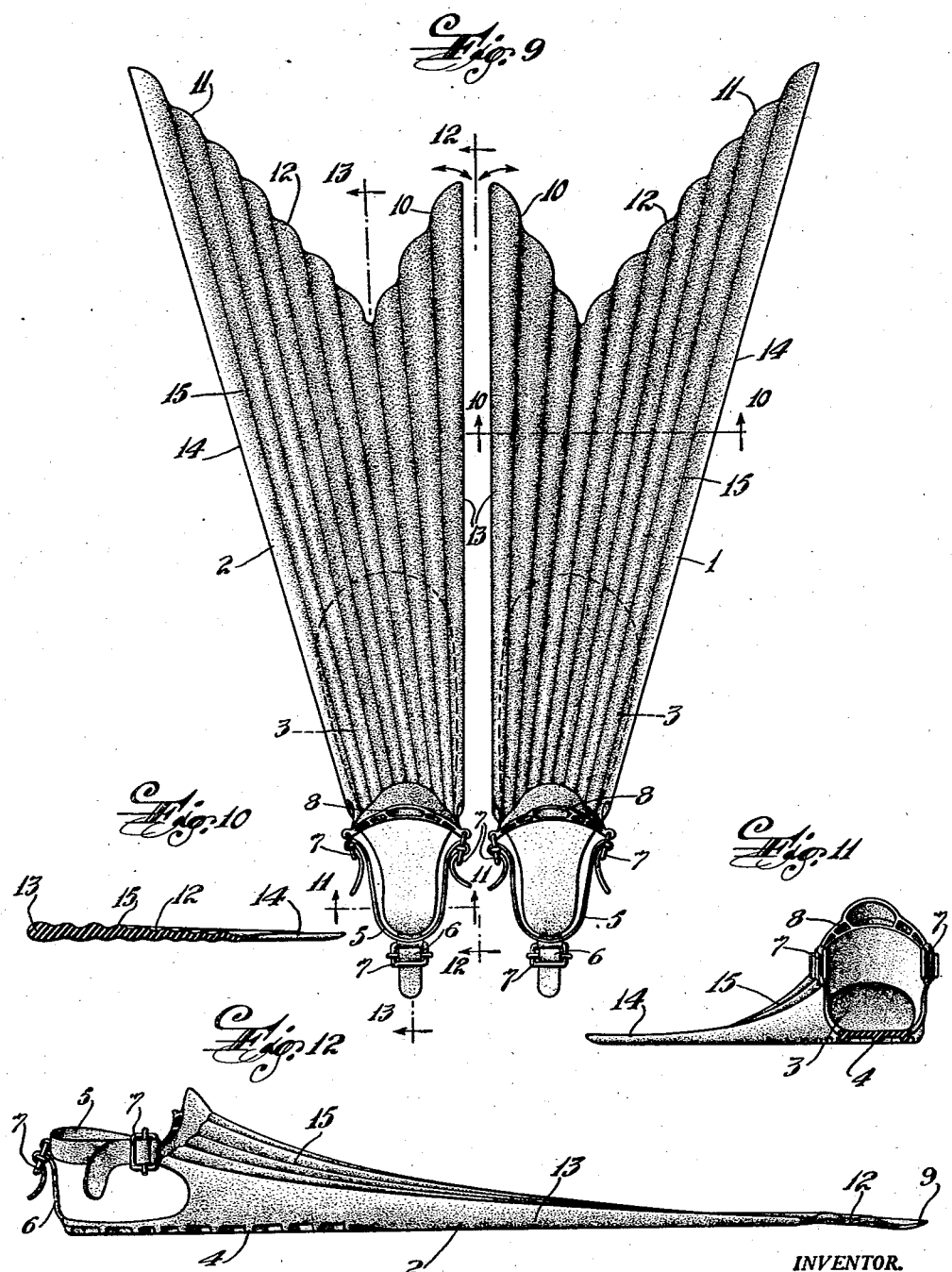

July 8, 1947.  C. H. WILEN  2,423,571
SWIMMING TAIL
Filed Dec. 20, 1944   4 Sheets-Sheet 3

INVENTOR.
Charles H. Wilen
BY A. D. T. Libby
Attorney

July 8, 1947.  C. H. WILEN  2,423,571
SWIMMING TAIL
Filed Dec. 20, 1944  4 Sheets-Sheet 4
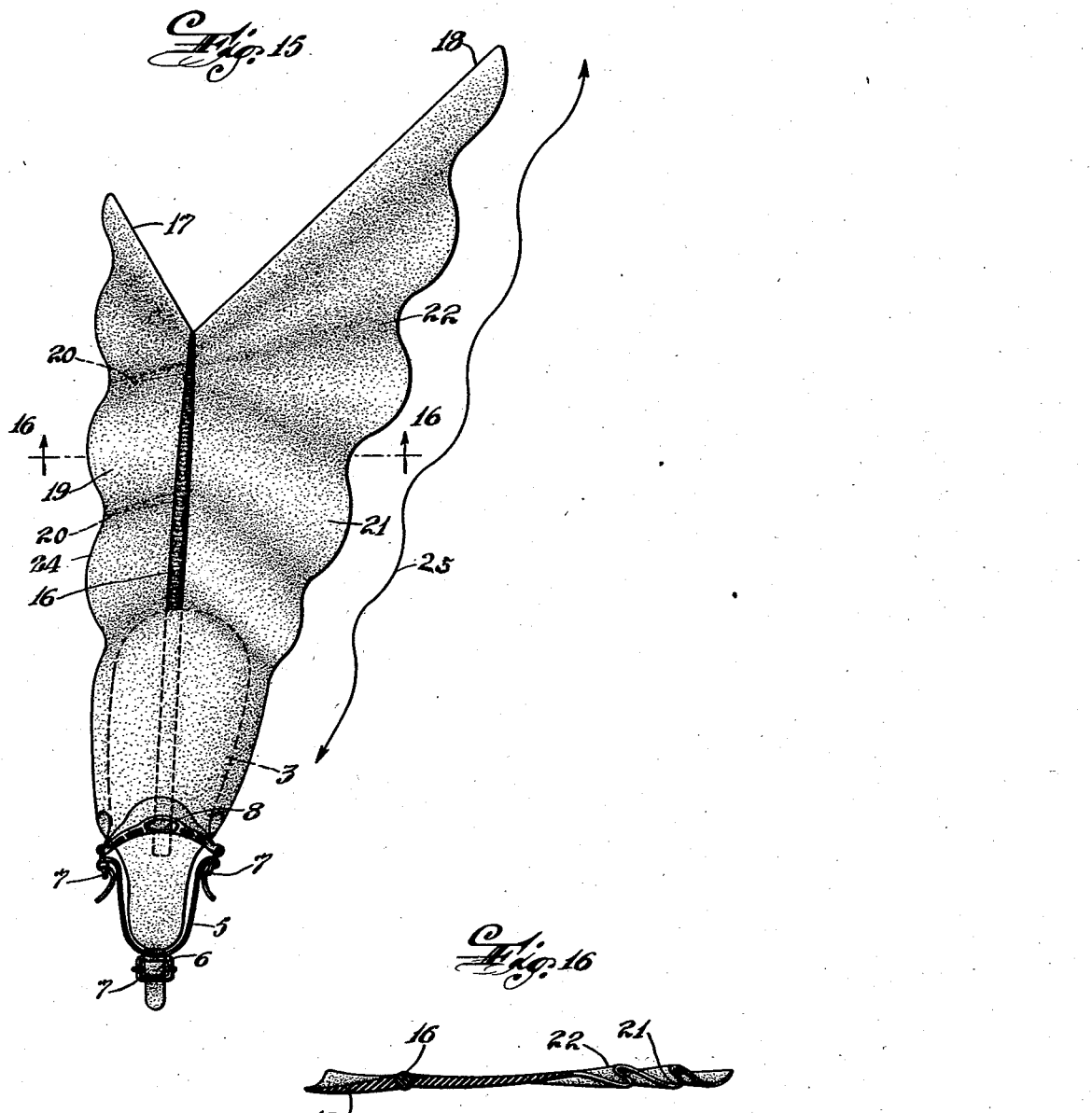
INVENTOR.
Charles H. Wilen
BY
A. D. T. Libby
Attorney Patented July 8, 1947

2,423,571

UNITED STATES PATENT OFFICE 2,423,571

SWIMMING TAIL

Charles H. Wilen, Brooklyn, N. Y.

Application December 20, 1944, Serial No. 568,971

16 Claims. (Cl. 9—21)

This invention relates to the construction of a device for use by swimmers to increase their speed of propulsion since there has always been a great desire on the part of man to increase his swimming speed and proficiency in the water.

As man has only his arms and legs with which to propel himself, it quite obviously appears that by increasing the surface of these members a greater displacement of water can be effected and a greater speed attained.

While developing a submarine gun for shooting fish as disclosed in my Patent 2,267,065, issued December 23, 1941; and a swimmers' mask as disclosed in my Patent 2,317,237, issued April 20, 1943, and allied devices referred to therein, I made a study of the system of locomotion used by various kinds of fishes, and in the following specification it is the principal object to develop a swimming tail that will function on man the same as fish use their tails. Naturally, the limitations of the human structure and physiology are a handicap to such an effort as man is not streamlined for water locomotion, his skin has no scales or other method of reducing water friction, and he has no gills or other apparatus for jet propulsion, an important adjunct in the locomotion of almost all fish.

After much study of the subject, including the various methods of locomotion used by various fish which I have analyzed, I have adopted what I consider to be the best and most adaptable features and combined them into practical structures, to be hereinafter described, for the use of man in swimming, but before entering into these descriptive matters, it seems better, for an understanding thereof, that some of the details of the locomotive fins or tails of fishes be described in general. This description falls into three classes:

First, a somewhat serpentine motion resembling a flag waving in the breeze, known as the anguilliform motion such as used by eels. This motion is produced by the pressure of the eel's body enclosed within the incurved body portions, thus causing a forward movement. This movement, by far the most important in general fish locomotion, is analogous to the mechanical motion produced by grasping a long rope and giving it a quick jerk at right angles to its axis. The waves will be seen to pass down the rope, dying out eventually on account of the lack of a continued impelling agent. This is one of the primary principles of my swimming tail, to which a continued impelling force is applied by the foot of the user.

Second, a weaving wig-wag motion as seen in a waving fan, produced by a rigidly encased fish such as the Lactophrys of the Ostraciidae.

Third, the movement of a generalized fish such as the Caranx of the Carangidae family, which can best be described as a motion halfway between the extremes of the anguilliform and the Ostraciidae, which I have endeavored to duplicate mechanically in my swimming tail. The latter means of locomotion is preeminently suited for speed and endurance, typical examples being the shark, Pomatomus, Scomber and fast oceangoing forms generally.

While the lashing of the tail from side to side is sufficient for a certain degree of locomotion, it is conceded by the best authorities that flexure, twist and oscillation are necessary to produce the greatest effect, just as sculling is more effective than the mere lashing of the same oar from side to side.

I have observed that more fish obtain a thrust from the tail by moving the inferior border to one side and the superior border to the other. The central ray of the tail remains substantially still and simply twists on its axis. On the other hand, such fish as illustrated in Figures 1, 2, 3 and 4, to be later described, obtain their thrusts by a series of complete cycles of oscillation of their anal and/or dorsal fins or wings as in the Raja of the ray family. All of these motions, either singly or in combination, have been embodied in various forms in the swimming tail of this application. Squarish or spatulate tailed fish are quick in spurts but not given to long continued high speed.

In general, there are two types of forked fish tails that give the greatest speed and endurance. These are the isobatic and the epibatic. For my purpose, I have found that the epibatic type, resembling the shark's tail, offers the greatest advantage, for it allows the designing of a swimming tail easily adaptable to a shoe-like pedal attachment applicable to the motion of the swimmer's feet, whereby no interference is produced between them.

I have also observed that in fish giving the maximum performance, such tails measure from tip to tip from 18% to 25% of the total length of the fish, and this principle is also embodied in the design of my swimming tail, and while the swimming tail can be made in many shapes resembling various fish tails, the advantage of the forked tail is as follows:

A swimmer can only advance in the water by displacing the water ahead of him. The water that is displaced forwardly is caused to move around the swimmer from head to foot more rapidly than does the swimmer's motion relative to the water outside of the limit of his influence. For maximum efficiency, this displaced water should meet immediately on leaving the converging lines of the swimmer's body. A square, flat tail would impede this movement by causing a parallel rim of the water after the two streams should have merged. Also, by placing the functional tips of the fish tail well above this point of influence, a much better purchase is had on the water. It is for this reason that the swimming tail to be described herein is preferably forked, and it should here be noted that the surface of the tail to be hereinafter described is definitely not a flat one. Such a surface would not utilize the potentialities of the anguilliform movement which is present in the locomotion of almost all fish, for even the Carangiform movement; that is to say, the movement of the more common fish species, is in reality an abbreviated form of the anguilliform or eel-like movement as shown in Figure 7.

This is due to the fact that the common types of fish in swimming, weave their heads at least to some extent, thus accomplishing a series of oscillatory movements resembling an abbreviated anguilliform movement. While in fish the tail undulation is operated primarily by the action of the body muscles, many fish at times may be seen to undulate the tail fin vertically and move forward slowly without any apparent effort. These waves travel at right angles to the undulation of the longitudinal structures and might be expected to raise or lower the posterior part of the fish. Observation, however, shows that such is not the case, other factors entering which translate the thrust into a forward one. One difference is that the rays are convergent and not parallel. Considering each ray separately in coming from side to side, it naturally has a forward action of the Ostraciiform type. The fact that about one-half the number operates in an opposing manner to the other half, causes a double effect which lessens the necessity of head oscillation. Also, the little vertical thrust dissipates itself. A slight twist of a fin imperceptible to the eye would readily offset any such action.

Having thus explained, in a general way, the different methods of the locomotion of a fish and the functions of the various appendages which are embodied in or used separately or in combination in my invention, I will now proceed with the description of the apparatus and the translation of the natural phenomena heretofore described into human motor impulses. In the drawings:

Figure 1 is an illustration of an Amiatus showing dorsal undulation.

Figure 2 is a Gymnotus showing anal undulation.

Figure 3 is a Monocanthus showing the combination of dorsal and anal undulations.

Figure 4 is a Raja whose pectoral undulation is an excellent illustration of the anguilliform movement.

Figure 5 is an isobatic or evenly forked tail.

Figure 6 illustrates an epibatic or unevenly formed tail as in the shark.

Figure 7 illustrates the Carangiform movement super-imposed on the anguilliform movement, showing that the former is in reality an abbreviated form of the latter.

Figure 8 illustrates the anguilliform locomotion, the feathered arrow indicating the direction of progression, while the short dark arrows indicate the direction of pressure from the backwardly moving waves.

Figure 9 is a top plan view of a pair of epibatic type swimming tails for the right and left foot of a swimmer.

Figure 10 is a view on the line 10—10 of Figure 9.

Figure 11 is a view on the line 11—11 of Figure 9, showing the interior part of the shoe or sandal-like portion.

Figure 12 is a side view of the left-foot swimming tail taken on the line 12—12 of Figure 9.

Figure 15 shows an alternative form of swimming tail embodying the anal and dorsal system of locomotion.

Figure 16 is a view on the line 16—16 of Figure 15.

Figure 13:
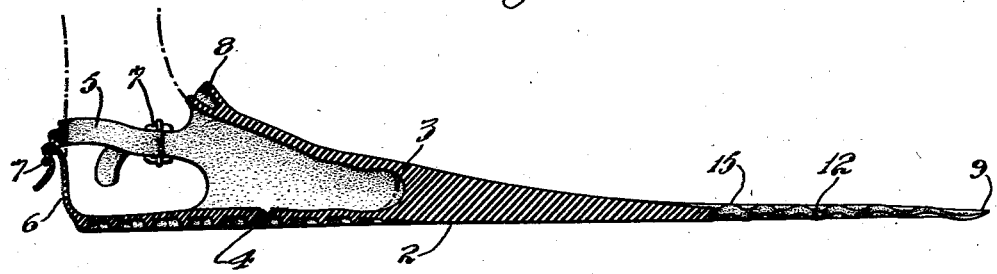
Figure 13 is a sectional view on the line 13—13 of Figure 9.
Figure 14:
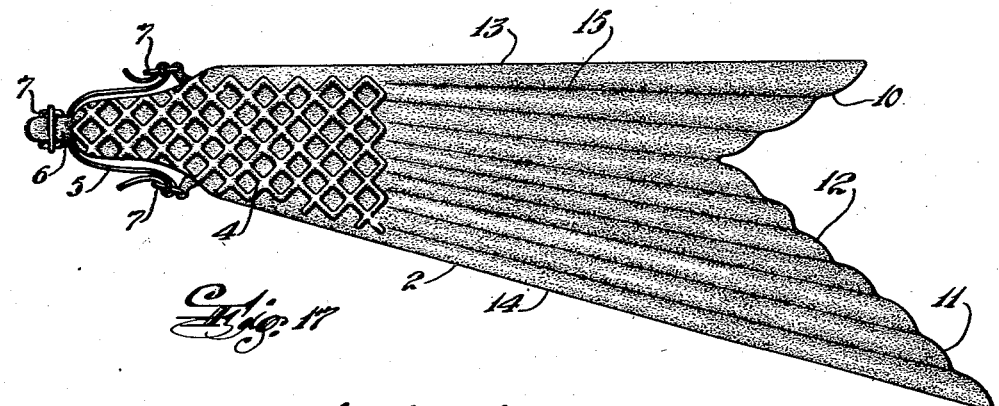
Figure 14 is a bottom view of the swimming tail for the left foot.

In the various views, wherein like numbers refer to corresponding parts, and referring more particularly to Figures 9 to 16 inclusive, 1 and 2 are swimming tails of the epibatic type designed, respectively, for the right and left foot. Since they are constructed in greater part in a similar manner, the description of one will suffice for the other.

Each of the tails has a receptacle portion positioned within the broken line 3 for the reception of the foot of the user. The bottom of the receptacle or foot-receiving portion is preferably ribbed or striated at 4 to prevent slipping when the swimmer is landing or stepping or walking on stones, sharp coral, sea urchins, venomous fish or on smooth or slippery surfaces. An adjustable strap 5 passes around the ankle or leg of the swimmer, and this strap, together with an adjustable sole strap 6, serves to fasten the swimming tail to the foot of the swimmer. The sole strap is preferably striated on its under surface to prevent slipping. The straps are adjustable through the medium of a plurality of buckles 7 which are positioned in such a manner as to give as much of a streamline effect as possible. To add to the comfort of the swimmer, the upper edge of the foot receptacle 3 is provided with an alveolated construction 8 which will give a soft cushioning effect against the instep of the swimmer.

The swimming tail extends away from the foot receptacle a considerable distance as illustrated by several of the Figures, i. e., 9, 12, 13, 14, 15 and 17, and as shown in one or more of these figures, this extended portion tapers outwardly away from the receptacle 3 down to a relatively thin edge 9. This edge is divided into two forks 10 and 11 and, as indicated in Figure 9, forms a tail of the epibatic type wherein the portion 11 extends beyond the portion 10.

Furthermore, as will be seen from the various figures, the surface of the tail, while tapering in thickness toward the end as just described, is also provided with a plurality of wave or undulated surfaces 12, the fork portion 11 having approximately double the wave or undulated sections of the fork portion 10. Since the swimming tail is made out of any suitable light, resilient material, such as rubber, these wave sections will readily respond in the water to the force applied thereto by the swimmer. As will be seen from Figure 9, the epibatic type of tail provides a construction which eliminates interference between the swimming tail on each foot of the swimmer.

I prefer to make the inner edge or border 13 of the swimming tail thicker or more rigid than the outer border 14. This allows the outer border to move further and faster than the inner border during a swimming stroke such as the crawl stroke. As a result, the Carangidae effect is obtained. The two inner borders 13, due to their greater rigidity, act like the central ray of a fish-tail which remains relatively stationary, while the two outer borders move ultimately in greater sweeps, the right outer border 14 being pushed down as the right foot is raised, while the outer border 14 of the left foot tail 2 is pushed upwardly when the left foot is moved downwardly. While this motion is taking place, the undulations of the rays between the two borders impart an impetus due to their anguilliform action. The inner and outer borders 13 and 14, as well as the rays 15 which separate the undulations 12, may be reenforced with strengthening material if so desired, such as a spring wire of beryllium copper or other satisfactory material to increase the rigidity while still maintaining the required amount of resilience.

While I have found the above arrangement of outer and inner borders as described to give the greatest speed and efficiency in the water, it is entirely possible to reverse this order but with a loss of power.

Figure 17:
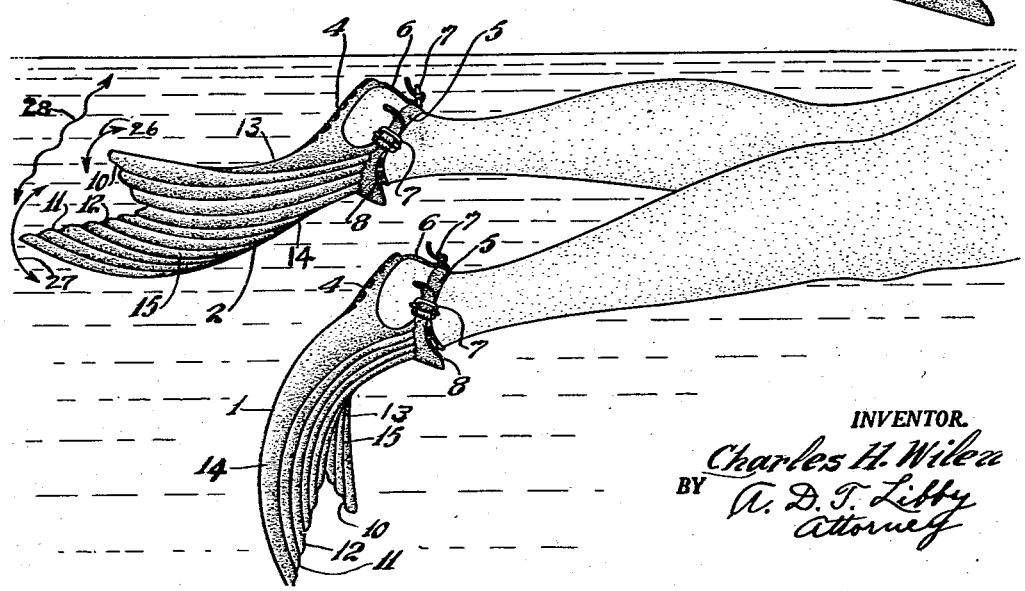
Figure 17 shows a pair of swimming tails of the epibatic type on the feet of a swimmer doing the crawl stroke.

For certain purposes, while I prefer to use three undulations on the short portion 10 of the tail piece, and seven on the longer portion 11, these numbers can be changed to suit. In Figure 17, the curved arrow 26 represents the relatively short motion of the thickened inner edge 13 as against the longer sweep shown by the arrow 27 of the thinner outer edge 14, the direction of travel of the undulations being illustrated by the wavy line 28. I have found that lightness is an asset in the swimming tail as the lighter the fin, the more rapid the swimming progress.

In Figure 15, I have shown a swimming tail of the analdorsal type for the right foot. The receptacle part 3 is the same as has been described with respect to the construction shown in Figure 9, but it has a median rib 16 extending from the receptacle 3 to the junction of the two portions of the two forked portions 17 and 18 of the tail. From the rib 16, the narrow portion 19 tapers outwardly and is also provided with a plurality of undulating sections 24. The wider portion 21 also tapers outwardly from the median rib 16 and is provided with a plurality of undulations 22. The direction of travel of these undulations is shown by the wavy line 25. As shown in Figure 15, the undulations 24 and 22 may be reenforced as indicated at 20 by any suitable material if so desired. In this form, due to the epibatic form of tail, a sculling action is obtained since the two portions 19 and 21 will oscillate about the rib 16, allowing each tail portion to move without interfering with the other like the propellers on a side-wheel river boat, simulating the action of the tail of the Carassius Auratus or fancy show gold fish whose double tail undulates as it oscillates. To add to the efficiency of the anguilliform motion, the median rib 16 may be mounted on a pivotal axis, allowing a limited oscillatory sculling movement from side to side, induced by an up-and-down movement of the foot in pressure on the water on the uneven sides of the epibatic tail form. The degree of side-to-side oscillation can be controlled by inserting a more flexible material at the base of the tail where it joins the receptacle portion 3 of the swimming tail.

In the foregoing, I have endeavored to point out the advantages derived from imitating the action of various types of fish and have incorporated these actions into my new swimming tail. While many of the details may be varied, this may be done without departing from the spirit of my invention or the scope of the appended claims.

What I claim is:

1. A swimming tail of resilient material having, a receptacle portion to receive a swimmer's foot with means for fastening the foot in said receptacle, a tail part extending from the receptacle portion and terminating in a forked fish-like tail end having a relatively thick inner border tapering laterally outwardly to a thin edge at the outer border whereby an undulating Carangidae effect is obtained.

2. A swimming tail of resilient material having, a receptacle portion to receive a swimmer's foot with means for fastening the foot in said receptacle, a tail part extending from the receptacle portion and terminating in a forked epibatic type end having a relatively thick inner border tapering laterally outwardly to a thin edge at the outer border.

3. A swimming tail of resilient material having, a receptacle portion to receive a swimmer's foot with means for fastening the foot in said receptacle, a tail part extending from the receptacle portion and terminating in a forked isobatic type end having a centrally located relatively thick portion tapered laterally away in opposite directions to thin edges at the outer border, the forked end being of sufficient proportions so as to give an anguilliform movement.

4. A swimming tail of resilient material having, a receptacle portion to receive a swimmer's foot with means for fastening the foot in said receptacle, a tail part extending from the receptacle portion and terminating in a formation including a plurality of undulating surfaces, each tapering laterally in opposite directions from a thick portion to a thin edge at the outer border which will produce an anguilliform locomotion.

5. A swimming tail of resilient material having, a receptacle portion to receive a swimmer's foot with means for fasteing the foot in said receptable, a tail part extending from the receptacle portion and formed with a plurality of undulating surfaces each tapering laterally in opposite directions from a thick portion to a thin edge at its outer border so as to produce, when in use, a combination eel-like and sculling motion.

6. A swimming tail of resilient material having, a receptacle portion to receive a swimmer's foot with means for fastening the foot in said receptacle, a tail part extending from the receptacle portion and formed with a plurality of undulating surfaces each tapering laterally in opposite directions from a thick portion to a thin edge at its outer border so as to produce, when in use, an action in the water similar to that of a fork-tailed fish, such as the fancy show gold fish (Carrasius Aureatus).

7. A swimming tail of resilient material having, a receptacle portion to receive a swimmer's foot with means for fastening the foot in said receptacle, a tail part extending from the receptacle portion and terminating in an epibatic type tail end in which one edge of the tail is relatively thick and tapers laterally to an opposite thin edge in a series of sections capable of producing undulating action, that part of the receptacle adapted to fit over the ankle of the swimmer having an alveolated rim for the purpose described.

8. A swimming tail of resilient material having, a receptacle portion to receive a swimmer's foot with means for fastening the foot in said receptacle, a tail part extending from the receptacle portion and terminating in an epibatic type tail end in which one edge of the tail is relatively thick and tapers laterally to an opposite thin edge in a series of sections capable of producing undulating action, the sole part of the receptacle having a thickened and outer striated surface, while that part of the receptacle adapted to fit over the ankle of the swimmer has an alveolated rim.

9. A swimming tail of resilient material having, a receptacle portion to receive a swimmer's foot with means for fastening the foot in said receptacle, a tail part extending from the receptacle portion and terminating in a forked epibatic type end, the entire swimming tail having substantially one straight inner edge or border corresponding to the inner edge of a swimmer's foot, and a tapering outer edge or border, the inner edge being thicker while the material laterally tapers in thickness from the inner border toward the outer border.

10. A swimming tail of resilient material having, a receptacle portion to receive a swimmer's foot with means for fastening the foot in said receptacle, a tail part extending from the receptacle portion and terminating in a forked epibatic type end, the entire swimming tail having substantially one straight inner edge or border corresponding to the inner edge of a swimmer's foot, and a tapering outer edge or border, the inner edge being thicker while the material tapers in thickness from the inner border toward the outer border, the material between the inner and outer border being divided by ray lines into undulating sections.

11. A swimming tail of resilient material having, a receptacle portion to receive a swimmer's foot with means for fastening the foot in said receptacle, a tail part extending from the receptacle and terminating in a forked end in which one edge of the tail is relatively thick and tapers laterally to an opposite thin edge in a series of sections capable of producing undulating action so as to simulate the oscillatory-like motion of a deeply forked caudal fin of a fish.

12. A swimming tail of resilient material having, a receptacle portion to receive a swimmer's foot with means for fastening the foot in said receptacle, a tail part extending from the receptacle and terminating in a forked end in which one edge of the tail is relatively thick and tapers laterally to an opposite thin edge in a series of sections capable of producing undulating action so as to simulate the rippling, undulatory or anguilliform movement of the anal and dorsal fins of fish of the Monocanthus type.

13. A swimming tail of resilient material having, a receptacle portion to receive a swimmer's foot with means for fastening the foot in said receptacle, a tail part extending from the receptacle and terminating in a forked end with a stiffening median rib extending from the junction of the forked ends to the inner end of the foot receptacle, the material of the tail tapering in thickness from said rib to the opposite edges of the tail.

14. A swimming tail of resilient material having, a receptacle portion to receive a swimmer's foot, with means for adjustably fastening the tail to feet of different size, the extremity of the tail being unevenly forked and provided with undulating parts extending from a relatively thick portion to an outer thin edge so as to simulate, when in motion in water, the combined and composite movements of the three principal forms of fish locomotion: anguilliform, Ostracidae, and Carangidae.

15. A swimming tail as set forth in claim 13, further characterized in that spaced reenforcing means extend from said median rib to at least one edge of the tail.

16. A swimming tail as set forth in claim 13, further characterized in that the part of the tail on one side of the median rib is much shorter and narrower than the other part and has spaced reenforcing means.

CHARLES H. WILEN.

REFERENCES CITED

The following references are of record in the file of this patent:

UNITED STATES PATENTS

| Number | Name | Date |
|---|---|---|
| 2,321,009 | Churchill | June 8, 1943 |
| 2,099,973 | Corlieu | Nov. 23, 1937 |

FOREIGN PATENTS

| Number | Country | Date |
|---|---|---|
| 323,623 | Italy | Dec. 31, 1934 |
| 621,761 | France | Feb. 12, 1927 |